(12) United States Patent
Furui

(10) Patent No.: US 7,237,840 B2
(45) Date of Patent: Jul. 3, 2007

(54) CHILD SEAT

(75) Inventor: Takeshi Furui, Saitama (JP)

(73) Assignee: Combi Corporation, Tokyo (JP)

( * ) Notice: Subject to any disclaimer, the term of this patent is extended or adjusted under 35 U.S.C. 154(b) by 314 days.

(21) Appl. No.: 10/878,934

(22) Filed: Jun. 29, 2004

(65) Prior Publication Data

US 2004/0262967 A1 Dec. 30, 2004

(30) Foreign Application Priority Data

Jun. 30, 2003 (JP) .............................. 2003-187426

(51) Int. Cl.
*A47C 1/08* (2006.01)
(52) U.S. Cl. ................. 297/256.1; 297/250.1
(58) Field of Classification Search ............. 297/250.1, 297/256.1, 256.11, 256.13
See application file for complete search history.

(56) References Cited

U.S. PATENT DOCUMENTS

| | | | | |
|---|---|---|---|---|
| 5,567,007 A | * | 10/1996 | Czernakowski et al. . | 297/250.1 |
| 5,695,243 A | * | 12/1997 | Anthony et al. ......... | 297/250.1 |
| 5,988,743 A | * | 11/1999 | Drexler ................... | 297/250.1 |
| 6,126,234 A | * | 10/2000 | Cabagnero ............. | 297/256.13 |
| 6,447,060 B1 | * | 9/2002 | Vila et al. ............... | 297/256.13 |
| 6,554,358 B2 | * | 4/2003 | Kain ...................... | 297/256.13 |
| 2002/0043840 A1 | * | 4/2002 | Kain ..................... | 297/256.16 |
| 2005/0035635 A1 | * | 2/2005 | Hendrikus ............... | 297/250.1 |

FOREIGN PATENT DOCUMENTS

EP 967113 A2 * 12/1999

* cited by examiner

*Primary Examiner*—David R. Dunn
*Assistant Examiner*—Sarah B. McPartlin
(74) *Attorney, Agent, or Firm*—Young & Thompson

(57) ABSTRACT

In a child seat comprising a base unit fixed onto a seat of a vehicle by using a seat belt of the vehicle and a seat unit provided with a seat cushion portion and a seat back portion and fixable onto the base unit in a forward attitude with respect to the seat, a waist belt portion of the seat belt can be inserted between the base unit and the seat cushion portion in a lateral direction of the seat, and further, a waist belt guide for inhibiting the movement of the base unit forward of the seat by hooking the waist belt portion is provided in the base unit so as to hold the waist belt portion at a position nearer a fore end of the base unit.

7 Claims, 15 Drawing Sheets

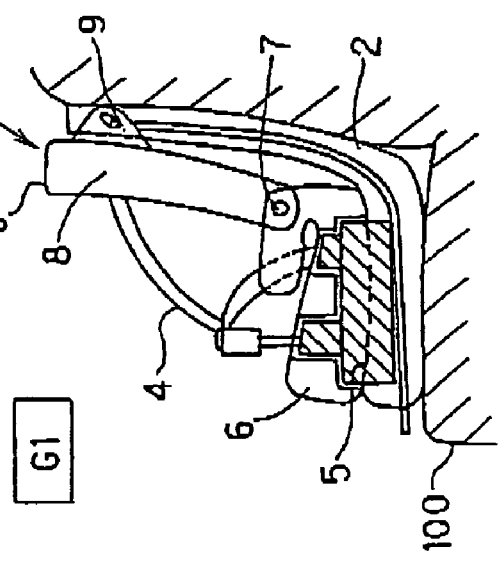
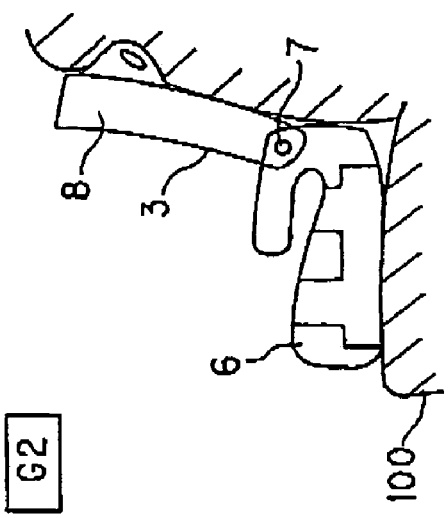
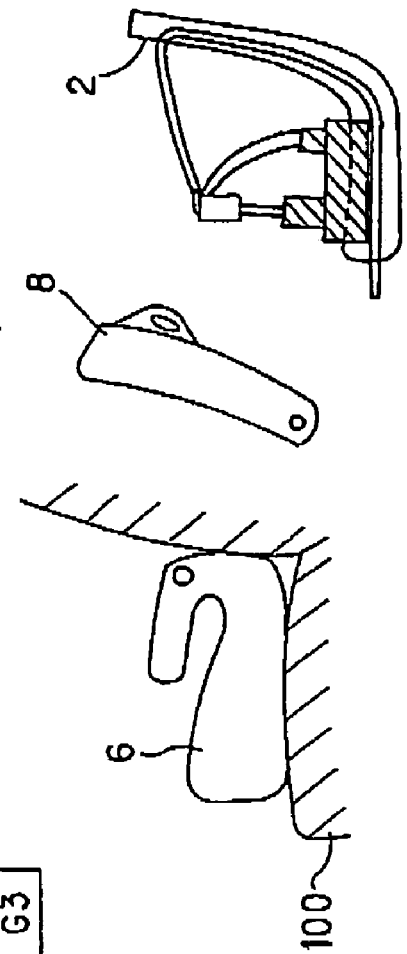

FIG.3A
FIG.3B
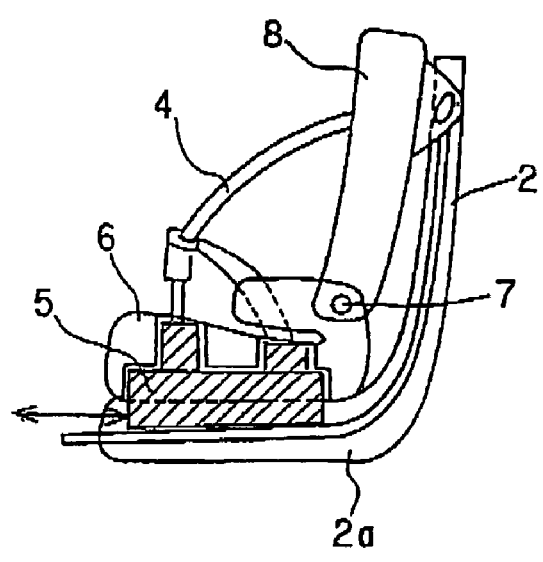
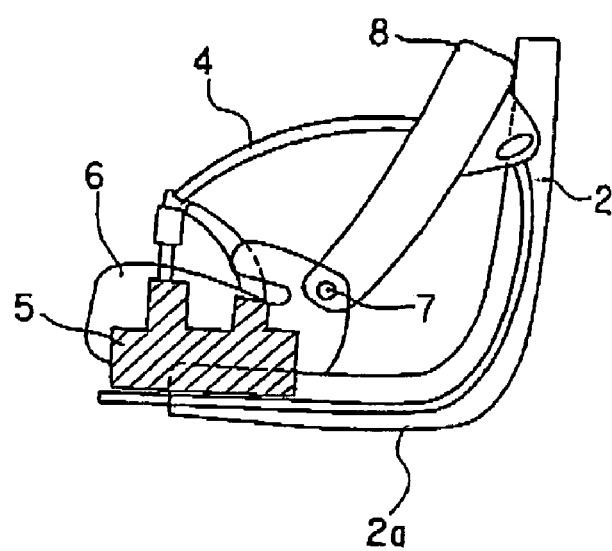

CHILD SEAT

BACKGROUND OF THE INVENTION

1. Field of the Invention

The present invention relates to a child seat, in which a seat unit is placed on a base unit to be fixed to a seat of a vehicle.

2. Description of the Related Art

In a child seat of a type which is fixed onto a seat by using a seat belt of a vehicle, a belt inserting hole is formed on a seat unit, on which a child (including an infant) sits, or at the rear end of a base unit for supporting the seat unit, so as to inhibit the movement of the child seat forward in the vehicle by inserting a waist belt portion of the seat belt into the belt inserting hole and fixing the waist belt portion to a buckle.

However, the belt inserting hole formed on the child seat in the prior art is located upward apart from a cushion face of the seat. Therefore, in a configuration in which the belt inserting hole is formed at the rear end of the seat unit or the like, the waist belt portion is hooked slantwise upward from a belt fixing position in the vehicle or the buckle of the seat belt at a relatively large angle. As the inclination of the waist belt portion with respect to the horizontal direction becomes greater, the child seat is less effectively restrained in the longitudinal direction of the seat by the waist belt. In order to complement such a reduced effect, the waist belt portion need be tightened to the child seat by considerably large force, thereby inducing the possibility of an increase in burden on a user in fixing the child seat.

SUMMARY OF THE INVENTION

The present invention has been accomplished to solve the above-described problem experienced in the prior art. Therefore, an object of the present invention is to provide a child seat capable of securely inhibiting the movement of a base unit forward of a seat by firmly restraining the base unit in a longitudinal direction by a waist belt portion of a seat belt of a vehicle.

The above-described problem is solved by a child seat according to the present invention comprising: a base unit fixed onto a seat of a vehicle by using a seat belt of the vehicle; and a seat unit including a seat cushion portion and a seat back portion and fixable onto the base unit in a forward attitude with respect to the seat, wherein a waist belt portion of the seat belt can be inserted in a lateral direction of the seat between the base unit and the seat cushion portion placed on the base unit, and a waist belt guide for inhibiting the movement of the base unit forward of the seat by hooking the waist belt portion inserted between the base unit and the seat cushion portion is provided in the base unit so as to hold the waist belt portion at a position nearer a fore end than the center in a longitudinal direction of the base unit.

According to the present invention, since the waist belt guide in the base unit is disposed nearer the fore end, the waist belt portion extending toward the waist belt guide from the buckle of the seat belt or the belt fixing position on a floor in the vehicle is reduced in inclination angle with respect to the horizontal direction in comparison with the case where the waist belt is hooked at the rear end of the base unit. Consequently, it is possible to more securely inhibit the movement of the base unit forward of the seat by more firmly restraining the base unit in the longitudinal direction by the waist belt portion. Furthermore, the waist belt portion is concealed by inserting the waist belt portion between the seat cushion portion and the base unit, thereby producing an advantage of prevention of the movement of the waist belt portion by an external factor. Incidentally, when the waist belt portion is wound around the fore side of the base unit, the waist belt portion is exposed to the outside at a relatively long distance along the outer surface of the base unit, thereby strengthening the fear of occurrence of the movement because the waist belt portion is caught by a passenger or luggage. However, the above-described fear can be certainly reduced by concealing the waist belt portion under the seat cushion portion.

In the child seat according to the present invention, the waist belt guide may be provided such that the waist belt portion is hooked in a state oriented substantially vertically in a width direction. Consequently, the contact area between the waist belt guide and the waist belt portion is increased by hooking the waist belt portion on the waist belt guide in the above-described orientation, so that the base unit can be more stably held against an impact acceleration in the longitudinal direction.

The base unit may be provided with a base body fixed to the seat of the vehicle and a slider disposed in a positionally adjustable manner in the longitudinal direction with respect to the base body, the seat cushion portion may be fixed to the slider and the waist belt guide may be fixed to the base body. Even when the position of the seat unit in the longitudinal direction can be adjusted by fixing the seat cushion portion to the slider, the longitudinal impact acceleration to be transmitted to the slider can be reduced by disposing the waist belt guide in the base body.

When the slider is disposed, the base unit may be provided with a restraining belt device which comprises a pair of shoulder belts for restraining a child sitting on the seat cushion portion and a crotch belt connected to the shoulder belts, one end of each of the shoulder belts and the crotch belt may be fixed to a belt fixing portion of the slider, and the waist belt guide may be provided such that the waist belt portion passes between the seat cushion portion and the base unit forward of a position of the belt fixing portion with respect to the crotch belt when the slider is positioned at a fore end within a movable range of the slider. In this case, the waist belt portion cannot interfere with the seat cushion portion even by moving the slider in the longitudinal direction, thereby avoiding the fear that the movable range of the slider is reduced by the waist belt portion.

A recess, through which the waist belt portion passes, may be formed on the lower side of the seat cushion portion so as to prevent any interfere of the seat cushion portion with the waist belt portion over the entire region within the movable range of the slider. In this way, the waist belt portion cannot interfere with the seat cushion portion according to the positional adjustment of the slider, thereby avoiding the fear that the movable range of the slider is reduced by the waist belt portion.

In the child seat according to the present invention, the seat cushion portion may be movably disposed with respect to the base unit so as to allow the waist belt guide to be exposed. In this case, the waist belt guide may be exposed by lifting up the seat cushion portion around a cushion rotary shaft extending in the lateral direction of the seat disposed at the end in the longitudinal direction of the seat cushion portion.

With the above-described modes, the waist belt portion can be readily hooked on or detached from the waist belt guide by moving the seat cushion portion so as to expose the waist belt guide.

In the child seat according to the present invention, a back supporter abutting against a seat back of the seat of the vehicle so as to support the seat back portion from the back side thereof may be disposed in the base unit, and the back supporter may be provided with a lock-off device for restraining a shoulder belt portion of the seat belt of the vehicle.

With the above-described mode, the base unit can be completely restrained by the seat belt of the vehicle by securely restraining the lower portion of the base unit by the waist belt portion hooked on the waist belt guide in the longitudinal direction and restraining the shoulder belt by the lock-off device. Moreover, if the lock-off device is disposed at, in particular, a position rearward and upward of the waist belt guide, the upper end of the seat back in the child seat can be suppressed from moving forward, so as to enhance the restraining property of the child seat with respect to the seat of the vehicle.

BRIEF DESCRIPTION OF THE DRAWINGS

FIGS. 2A to 2C are views showing usage modes of the child seat shown in FIG. 1;

FIGS. 3A and 3B are views showing a mode in which the inclination of a seat back is varied in a state where a base unit and a seat unit are used in combination;

FIGS. 7A and 7B are views showing the configuration relating to the positional adjustment of the slider, wherein FIG. 7A is a perspective view showing the configuration of the upper portion of the slider, from which the seat cushion is detached, and FIG. 7B is a cross-sectional view taken along a line VIIb—VIIb of FIG. 7A;

DETAILED DESCRIPTION OF THE PREFERRED EMBODIMENTS

Figure 1:
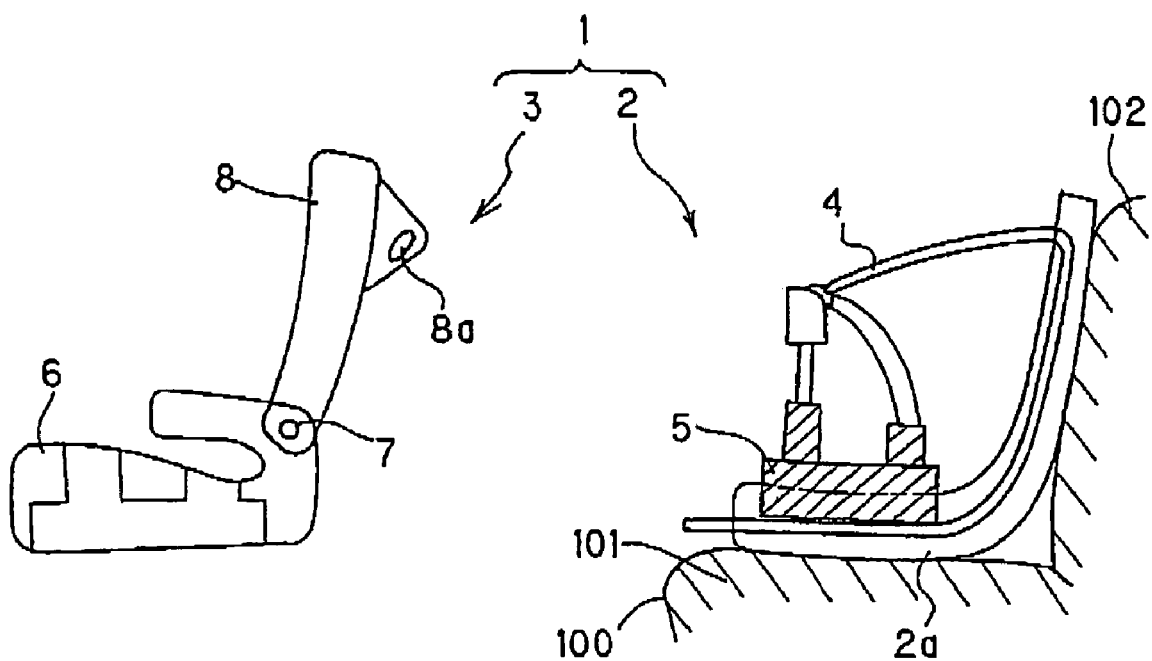
FIG. 1 is a view showing the basic configuration of a child seat in an embodiment according to the present invention.

First of all, the outline of a child seat in an embodiment according to the present invention will be explained in reference to FIGS. 1 to 3. As shown in FIG. 1, a child seat 1 comprises a base unit 2 and a seat unit 3 to be detachably attached onto the base unit 2. The base unit 2 is fixed by using a seat belt of a vehicle so as to be brought into contact with each of a seat cushion 101 and a seat back 102 of a seat 100 of the vehicle.

The base unit 2 includes a base body 2a to be fixed to the seat 100, a restraining belt device 4 for restraining a child (a child), and a slider 5 which can be positionally adjusted with respect to the base body 2a in a longitudinal direction of the seat 100.

In the meantime, the seat unit 3 includes a seat cushion portion 6 to be connected integrally with respect to the slider 5 in a positionally adjustable and detachable manner, and a seat back portion 8 to be turnably connected to the rear end of the seat cushion portion 6 via a strut 7 extending in a lateral direction of the seat 100 and to be detachably connected at the back thereof to the base unit 2.

The child seat 1 such configured as described above can be adapted to all of Group I to Group III specified in the European standard (ECE R44/03) by varying the usage mode of the child seat 1. First, when using the child seat as the G1 class, the seat cushion portion 6 is placed on the slider 5, as shown in FIG. 2A, and then, a reclining shaft 9 parallel to the strut 7 in the base unit 2 is fitted into a slot 8a (see FIG. 1) formed at the back surface of the seat back portion 8, so that the seat unit 3 is attached to the base unit 2 in a forward attitude with respect to the seat 100. A child sitting on the seat unit 3 is fixed to the seat unit 3 by using the restraining belt device 4 disposed in the base unit 2. In this usage mode, as shown in FIGS. 3A and 3B, the seat back portion 8 can be turned on the strut 7 by moving the slider 5 back and forth together with the seat cushion portion 6, thereby varying the reclining angle of the seat back portion 8.

In the case of the use as a child seat of the G2 class, the seat unit 3 is detached from the base unit 2, and then, is placed on the seat 100 in a forward attitude, as shown in FIG. 2B. A child sitting on the seat unit 3 is fixed by using the seat belt of the vehicle. Subsequently, when using the child seat as the G3 class, the seat back portion 8 is detached from the seat cushion portion 6, and then, the seat cushion portion 6 is placed on the seat 100, as shown in FIG. 2C. A child sitting on the seat cushion portion 6 is fixed by using the seat belt of the vehicle.

In this manner, according to the child seat 1 in the present embodiment, since the child is restrained by the restraining belt device 4 in the base unit 2 when using the child seat as the G1 class, even a small child can be more appropriately restrained in comparison with the case where the small child is restrained by using the seat belt of the vehicle. Since a relatively large structure such as a shield need not be disposed in front of the child, the child seat 1 is excellent in conformability. Since the inclination of the seat cushion portion 6 is not varied when the seat back portion 8 is reclined, the child is not forced to take an unnatural reclining attitude. Moreover, the child is restrained by using the seat belt of the vehicle when using the child seat as the G2 class. Since the seat unit 3 is not configured in a shell structure, a sufficient cabin can be secured. Additionally, the child seat 1 can be applied to the child seat of the G3 class, in which only the seat cushion portion 6 is used. As a consequence, there is produced an advantage that the single child seat 1 can be adapted to any one of the children of various builds.

Subsequently, a child seat 1 in a more specific embodiment will be described in reference to FIGS. 4 to 17. Here, the essential parts in the child seat 1 shown in FIGS. 1 to 3 are designated by the same reference numerals in FIGS. 4 to 17.

Figure 4:
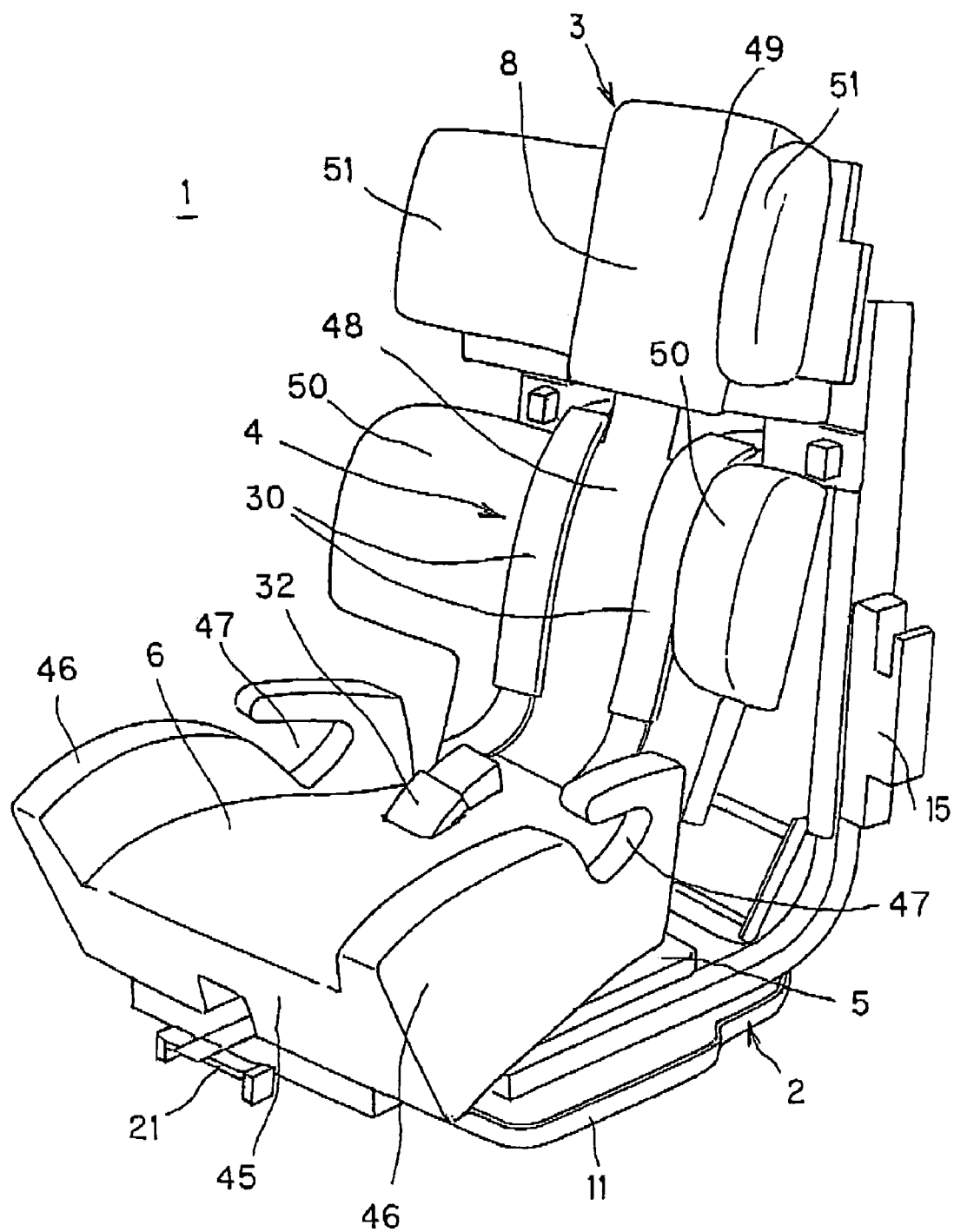
FIG. 4 is a perspective view showing a specific configuration of the child seat in the embodiment according to the present invention.

FIG. 4 is a perspective view showing the outline of the child seat 1. As described above, the child seat 1 comprises a base unit 2 and a seat unit 3 to be detachable attached to the base unit 2. The base unit 2 includes a restraining belt device 4.

Figure 5:
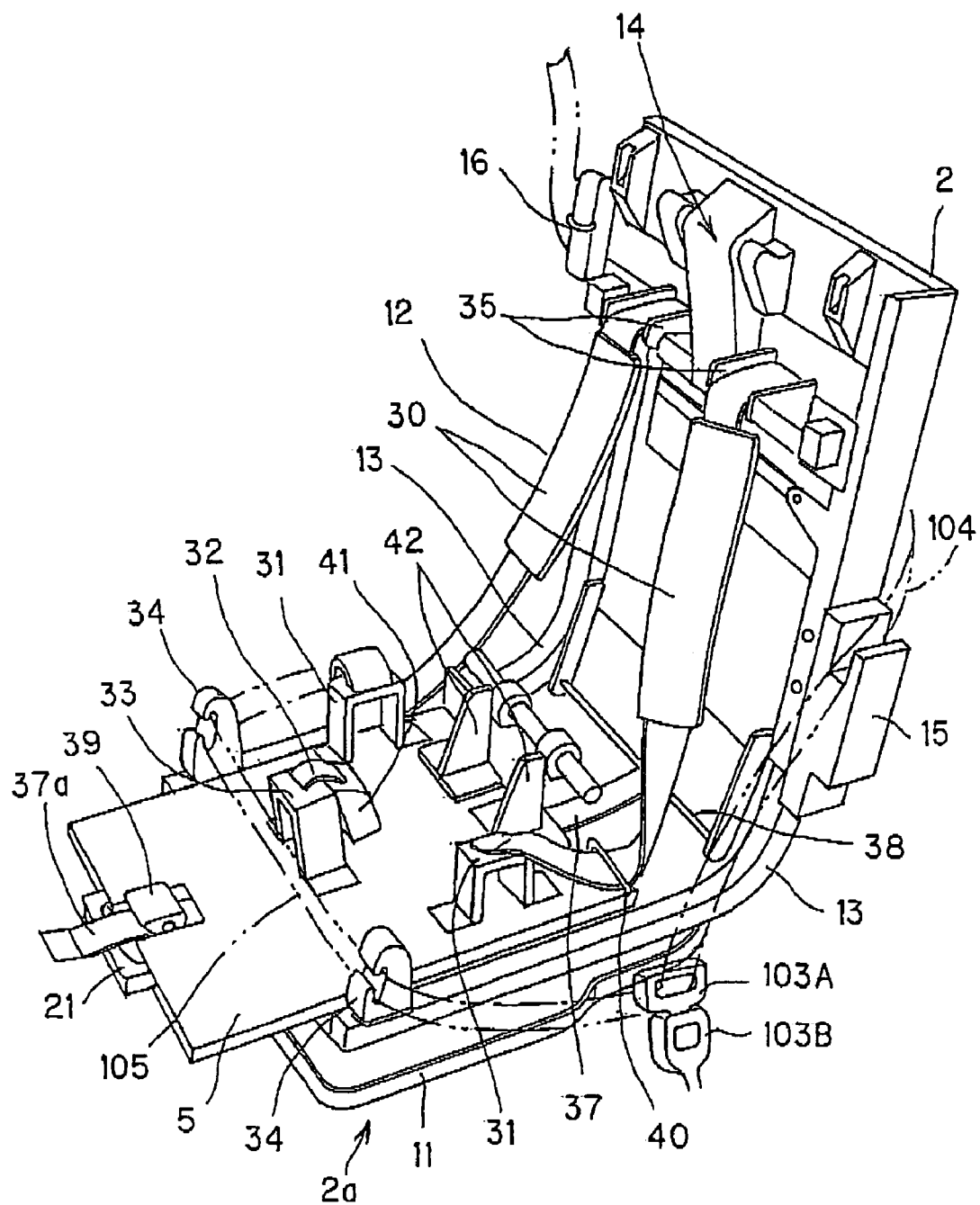
FIG. 5 is a perspective view showing the details of the base unit in a state where the seat unit shown in FIG. 4 is detached.

FIG. 5 is a view showing the details of the base unit 2, from which the seat unit 3 is detached. The base unit 2 includes a base body 2a. The base unit 2 is provided with a support base 11 serving as a supporter on a bottom side, and a back frame 12 serving as a supporter on a back side and extending upward from the rear end of the support base 11. The back frame 12 is provided with a pair of main frames 13 erected rearward from both sides of the support base 11, and a connecting portion 14 interposed between the pair of main frames 13.

A fixing belt guide (hereinafter simply referred to as "a belt guide") 15 and a lock-off device 16 serving as a restraining device are attached to each of the pair of main frames 13. In FIG. 5, there are shown only the fixing belt guide 15 attached to one of the main frames 13 and only the lock-off device 16 attached to the other main frame 13. The belt guide 15 is adapted to guide a shoulder belt portion 104 of a seat belt of a vehicle to the back side of the frame 12 when the base unit 2 is fixed to a seat 100 (see FIG. 1) by fitting a tongue 103A, through which the shoulder belt portion 104 is passed, to a buckle 103B. The lock-off device 16 is a well-known device for fixing the shoulder belt portion 104 to the base unit 2 by holding the shoulder belt portion 104 guided to the back side of the frame 12 between a pair of pawls.

The shoulder belt portion 104 stretched between an anchor, not shown, of the vehicle and a fixing position by the buckle 103B is guided to the back side of the back frame 12 along the belt guide 15 attached to one of the main frames 13 in the base unit 2, to be thus held by the lock-off device 16 disposed in the main frame 13 on the other side. Consequently, a belt length from an anchor of a waist belt portion 105 to the lock-off device 16 is set to a constant value, so that the base unit 2 is fixed to the seat 100. The shoulder belt portion 104 is not stretched across the fore side of the base unit 2 so as to avoid any interference of the shoulder belt portion 104 with shoulder belts 30 of the restraining belt device 4. Incidentally, when the relationship between the child seat 1 and the shoulder belt portion 104 in a drawing direction may be reverse on the right and left, the fixing positions of the belt guide 15 and the lock-off device 16 can be changed to the same height position of the main frames 13 on the opposite sides, respectively.

Figure 6:
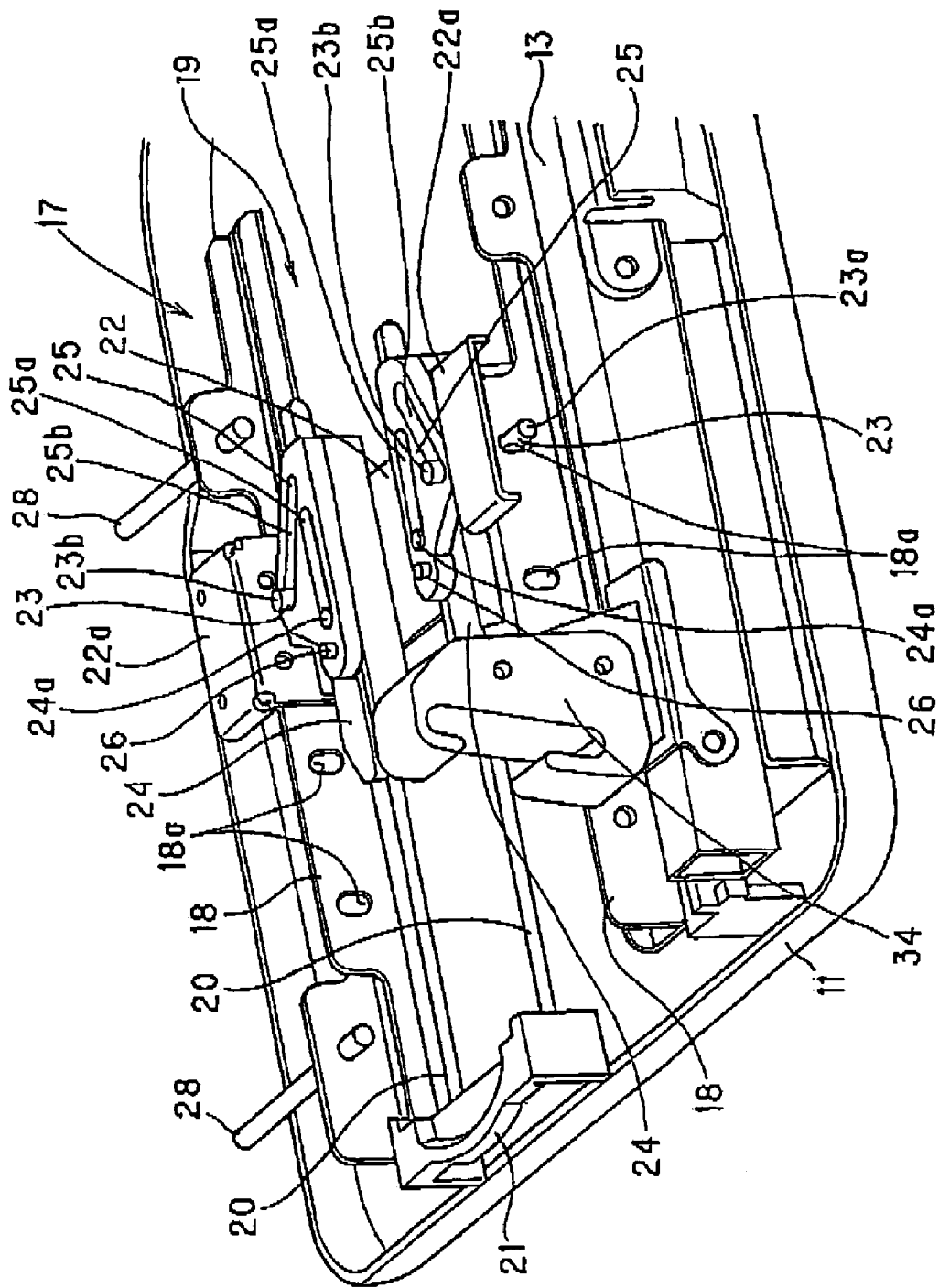
FIG. 6 is a perspective view showing the details of a position adjusting mechanism for connecting a base body and a slider to each other, shown in FIG. 4.

The slider 5 in the base unit 2 is connected to the upper surface side of the support base 11 in the base body 2a in a positionally adjustable manner in a longitudinal direction via a position adjusting mechanism 17 shown in FIG. 6. Here, FIG. 6 shows a state of the position adjusting mechanism 17 in detail, in which the slider 5 is detached from the base unit 2. The position adjusting mechanism 17 includes a pair of rails 18 which are disposed in the support base 11 and extend in the longitudinal direction, a lock unit 19 interposed between the pair of rails 18, a pair of rods 20 extending forward of the lock unit 19, and a position adjusting lever 21 secured at the tips of the rods 20. The lock unit 19 is provided with a base plate 22 which can move back and forth along and between the rails 18. At the upper surfaces of slider receivers 22a at both ends of the base plate 22 is secured the slider 5. Under each slider receiver 22a is disposed a lock pin 23. A tip portion 23a of each lock pin 23 is alternatively inserted into any one of lock holes 18a . . . 18a formed at each of the rails 18, so that the slider 5 can be secured at any one of a plurality of positions with intervals in the longitudinal direction.

Lock pin driving cams 25 are disposed at the upper surface of the base plate 22 via cam bases 24. Each lock pin driving cam 25 is supported movably within a limited range in the longitudinal direction with respect to the cam base 24 by fitting a guide pin 24a of the cam base 24 into a guide groove 25a extending in the longitudinal direction. Moreover, in the lock pin driving cam 25 is formed a pin driving groove 25b inclined slantwise in the longitudinal direction so as to be away forward from the outside of the guide groove 25a. To the pin driving groove 25b is fitted a base portion 23b of the lock pin 23. Additionally, the lock pin driving cam 25 is connected to the rod 20 via a connecting pin 26, and further, is urged rearward by an urging mechanism, not shown. The urging mechanism can hold the lock pin driving cam 25 at a standby position at which the guide pin 24a abuts against the fore end of the guide groove 25a.

Figure 7A:
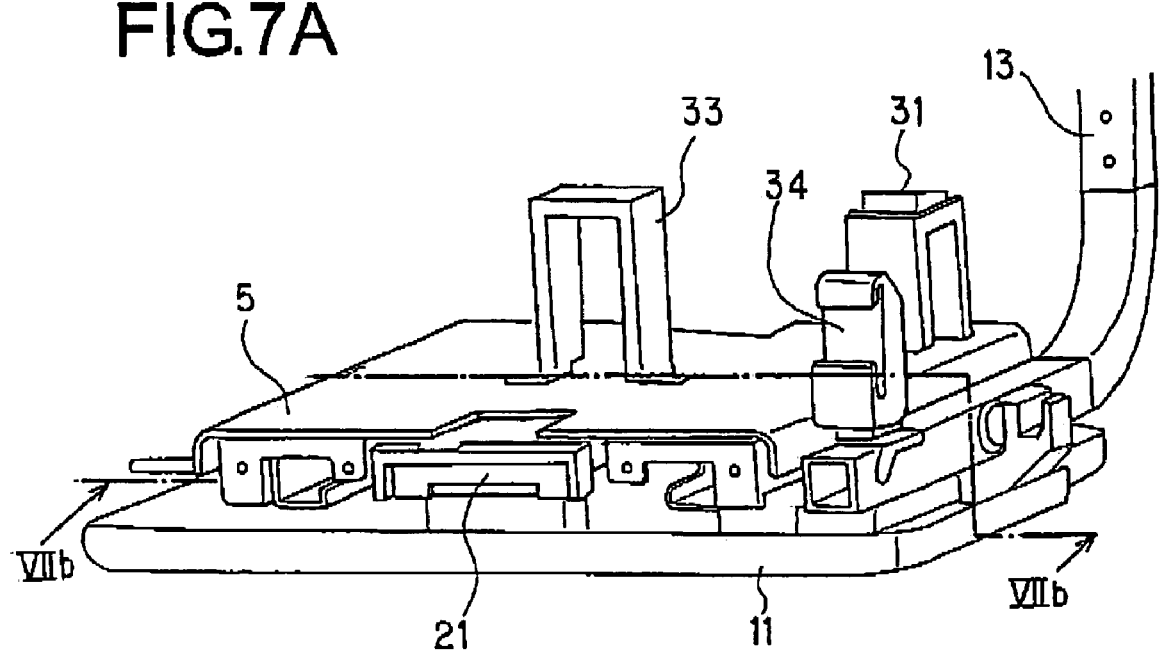
Figure 7B:
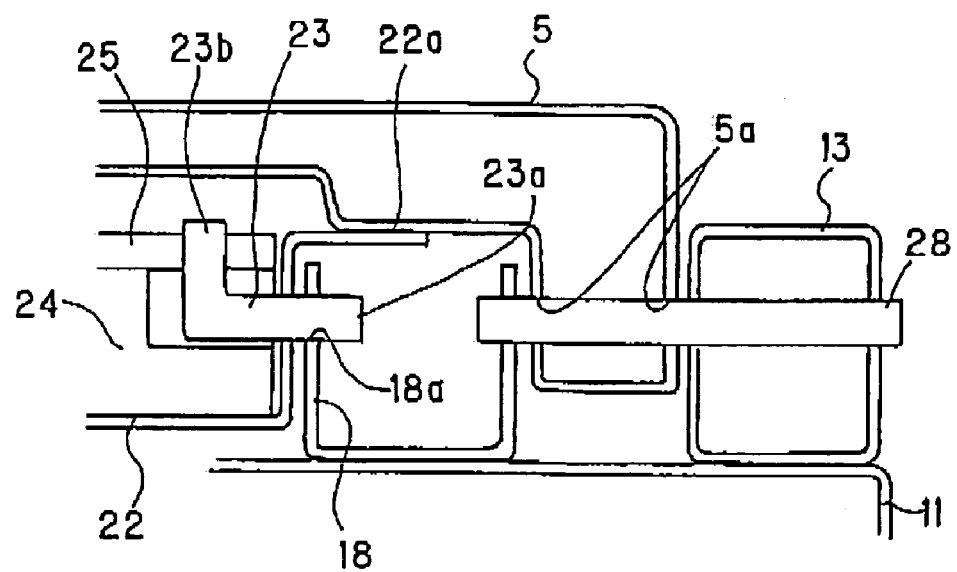

When the position adjusting lever 21 is pulled forward, the operation is transmitted to the lock pin driving cams 25 via the rods 20, and thus, the cams 25 advance with respect to the base plate 22. With the advance of the lock pin driving cams 25, the base portions 23b of the lock pins 23 are relatively moved toward the rear ends of the pin driving grooves 25b. According to the inclination of the pin driving grooves 25b, the lock pins 23 are drawn into the lock unit 19. As a result, the tip portions 23a of the lock pins 23 disengage from the lock holes 18a, so that the slider 5 can be moved back and forth with respect to the rails 18. Incidentally, as shown in FIGS. 7A and 7B, each rail 18 includes a plurality of slider connecting pins 28 projecting outward in a lateral direction. The slider connecting pin 28 is fitted into a longitudinal slot 5a formed on the slider 5. Consequently, the slider 5 can be prevented from being slipped off in a vertical direction while allowing the positional adjustment of the slider 5 in the longitudinal direction.

Returning to FIG. 5, at the upper surface of the slider 5 are disposed fixing portions 31 for the pair of shoulder belts 30 in the restraining belt device 4 and a fixing portion 33 for a crotch belt 32 in the restraining belt device 4. The fixing portions 31 and 33 project from the upper surface of the slider 5 so as to fix the belts 30 and 32, respectively, at substantially the same height as the seat level of the seat cushion portion 6 disposed in the slider 5.

As shown in FIG. 5, at the fore ends of the main frames 13 are disposed waist belt guides 34, for guiding the waist belt portion 105 of the vehicle, so as to project on both sides of the slider 5. The longitudinal position of each waist belt guide 34 is determined such that the waist belt portion 105 is away forward from the crotch belt fixing portion 33 even if the slider 5 is moved at the fore end within the movable range thereof. Therefore, the waist belt portion 105 is held between the base unit 2 and the seat cushion portion 6 and at a position nearer the fore end than the center in the longitudinal direction of the base unit 2 by the waist belt guides 34. As a consequence, it is possible to reduce an inclination angle with respect to a horizontal direction of the waist belt portion 105 extending from the anchor and the buckle 103B of the vehicle toward the base unit 2, so as to enhance the effect of the restraint of the base unit 2 in the longitudinal direction by the waist belt portion 105.

Each waist belt guide 34 is configured to hold the band-like waist belt portion 105 in an erecting attitude along the vertical direction, and in other words, to hold the band-like waist belt portion 105 in an attitude in which the width direction of the waist belt portion 105 is oriented substantially in the vertical direction. Since the waist belt portion 105 is inserted into the waist belt guides 34 in the above-described attitude, the base body 2*a* of the base unit 2 can be firmly held by the waist belt portion 105 against a forward impact acceleration.

Figure 8:
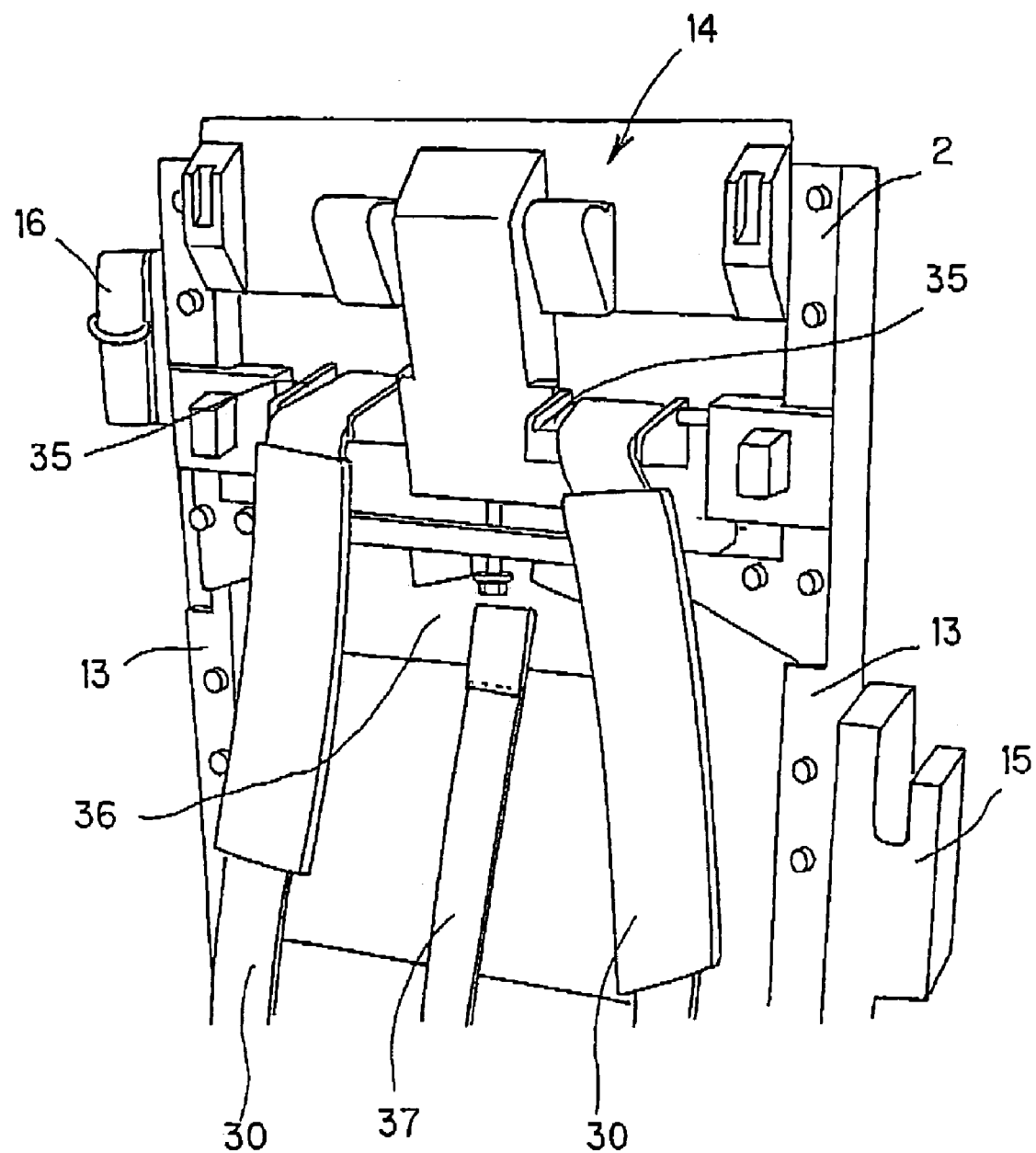
FIG. 8 is a view showing the upper portion of the base unit shown in FIG. 5, as viewed in another direction.
Figure 14:
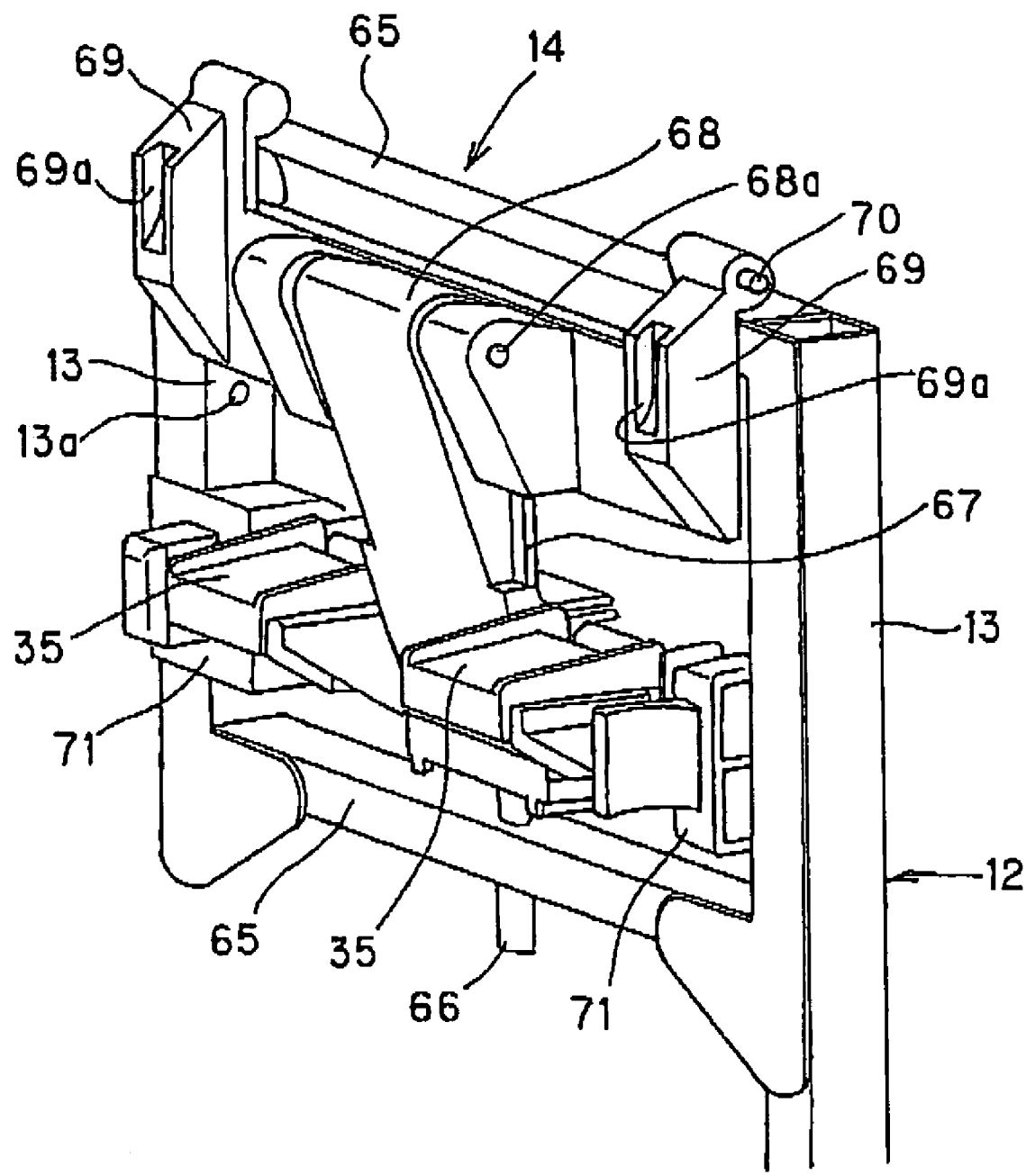
FIG. 14 is a view showing the configuration of a portion at which the seat cushion is connected to a back supporter in the base unit.

Under the connecting portion 14 for the frame 12 are disposed belt guides 35 for guiding the pair of shoulder belts 30 in the restraining belt device 4 (also see FIG. 14). As shown in FIG. 8, the shoulder belts 30 guided to the back side of the frame 12 via the belt guides 35 are connected to a single adjusting belt 37 via a connecting tool 36. As is clear from FIG. 5, the adjusting belt 37 is stretched around a connecting shaft 38 parallel to the strut 7 fixed between the lower ends of the main frames 13, to be thus guided between the support base 11 and the slider 5, and further, is pulled forward of the child seat 1 through a belt adjuster 39 disposed at the fore end of the slider 5. The belt adjuster 39 is a well-known belt length adjusting device for allowing the forward pulling operation of the adjusting belt 37 and inhibiting the adjusting belt 37 from being returned rearward unless a predetermined releasing operation is performed. A tongue 40 disposed in each shoulder belt 30 is secured to a buckle 41 at the tip of the crotch belt 32, and thereafter, a tip portion 37*a* of the adjusting belt 37 is drawn forward, so that the length of each shoulder belt 30 stretched between the fixing portion 31 and the belt guide 35 can be adjusted to a desired value. Moreover, bearing portion 42 for rotatably connecting the seat cushion portion 6 is disposed at the rear end of the slider 5.

Returning to FIG. 4, the seat cushion portion 6 has a cushion 45, on which a child (a child) sits, and side supports 46 disposed on both sides of the cushion 45. Restraining belt guides (hereinafter simply referred to as "belt guides") 47 for regulating the passing position of the waist belt portion 105 of the vehicle with respect to the seat cushion portion 6 are disposed on both sides at the rear end of the seat cushion portion 6 by cutting out the side supports 46. Incidentally, the belt guides 47 are not used in the usage mode of the G1 class, in which the base unit 2 is used. That is to say, the belt guides 47 are used in the usage mode of the G2 class, in which only the seat unit 3 is used, and in the usage mode of the G3 class, in which only the seat cushion portion 6 is used.

Further, the seat back portion 8 is equipped with a back rest 48 supporting the back of the child and a head rest 49 for supporting the head, and side supports 50 and 51 projecting sideways of the back rest 48 and the head rest 49, respectively. The shoulder belts 30 in the restraining belt device 4 are drawn forward of the seat unit 3 through clearances between the side supports 50 and 51.

Figure 9:
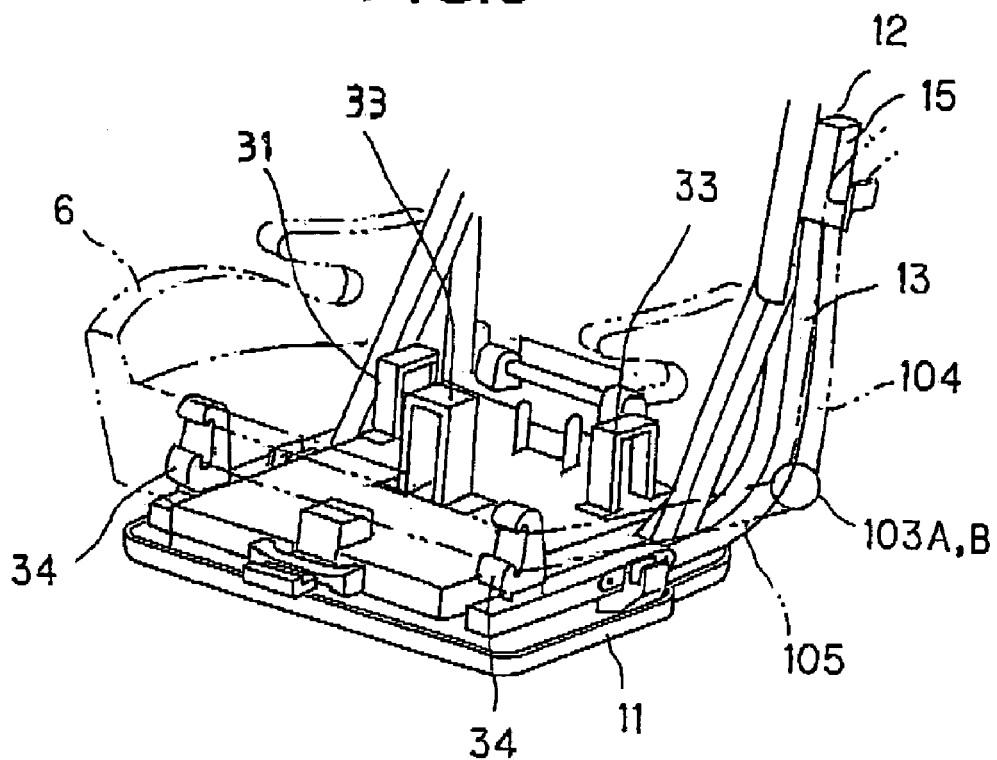
FIG. 9 is a view showing the schematic configuration of the upper portion of the base unit covered with the seat cushion shown in FIG. 4.
Figure 11:
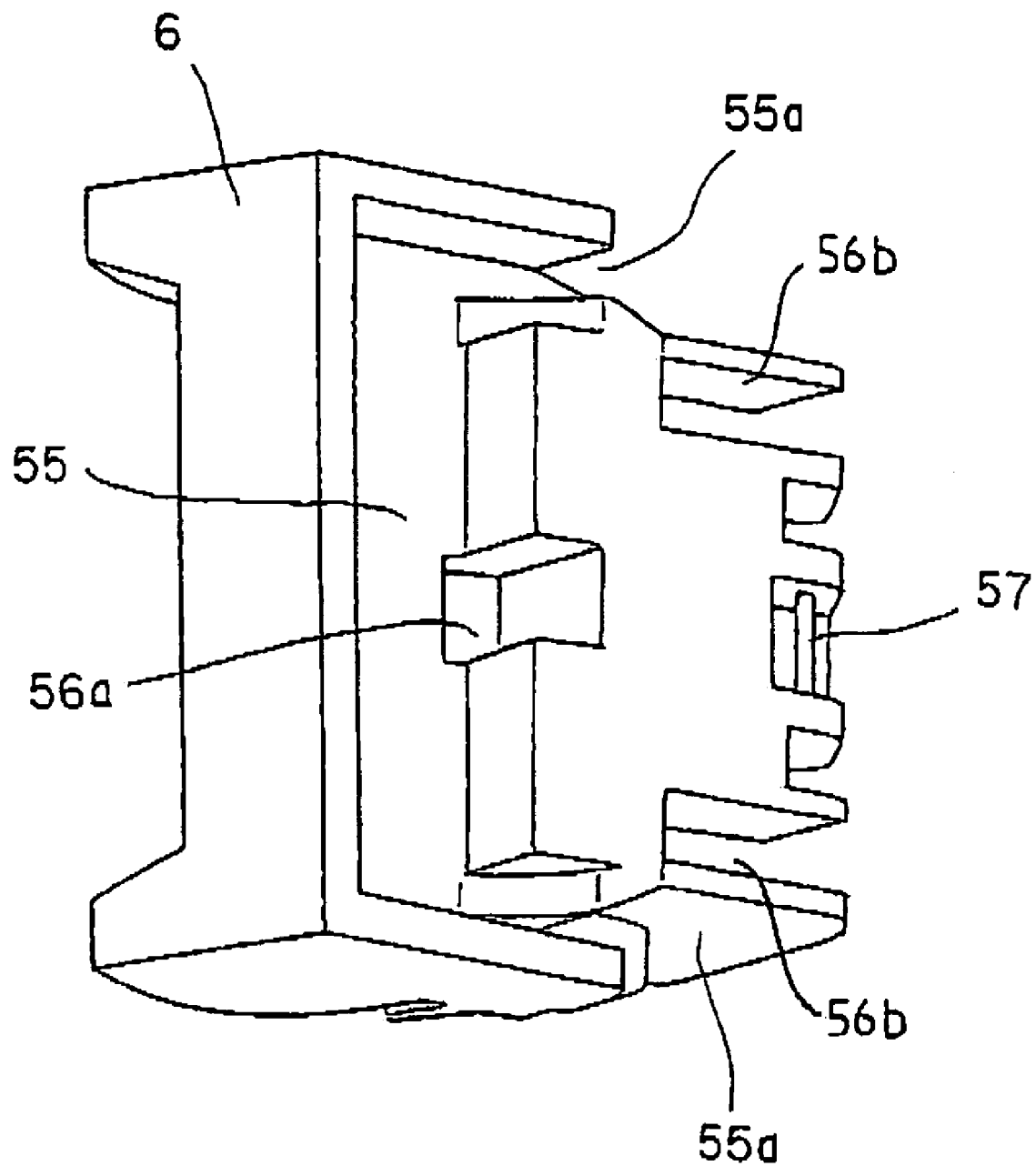
FIG. 11 is a view showing the configuration of the reversal portion of the seat cushion.

As shown in FIG. 9, all of the crotch belt fixing portions 33 and waist belt guides 34 disposed at the upper surface of the slider 5 and the waist belt portion 105 wound around the waist belt guides 34 are covered with the seat cushion portion 6 by putting the seat cushion portion 6 onto the slider 5. Thus, as shown in FIG. 11, a recess 55 for avoiding the interference of the waist belt guides 34 and the waist belt portion 105 stretched across the waist belt guides 34 with the seat cushion portion 6 is formed at the reverse side (i.e., the lower surface) of the seat cushion portion 6. The size and position of the recess 55 are determined so as to prevent any interfere of the seat cushion portion 6 with the waist belt portion 105 in all the region within a movable range of the slider 5. Openings 55*a* are formed on both sides at the rear end of the recess 55. The waist belt portion 105 extending from the waist belt guides 34 toward the anchor and the buckle 103B of the vehicle is drawn outside of the seat cushion portion 6 from the openings 55*a*.

A through hole 56*a*, through which the crotch belt 32 fixed to the fixing portion 33 and the buckle 41 are drawn to the upper surface side of the seat cushion portion 6, is formed at the seat cushion portion 6. Incidentally, one end of each shoulder belt 30 is secured to the fixing portion 31 while the other end is secured to the connecting tool 36, so that the shoulder belt 30 cannot be passed through the seat cushion portion 6 even if a through hole for the shoulder belt 30 is formed on the seat cushion portion 6. Consequently, as for the fixing portions 31 with respect to the shoulder belts 30, grooves 56*b* opened at the rear end of the seat cushion portion 6 are formed so as to allow the fixing portions 31 to pass through the seat cushion portion 6.

Figure 10:
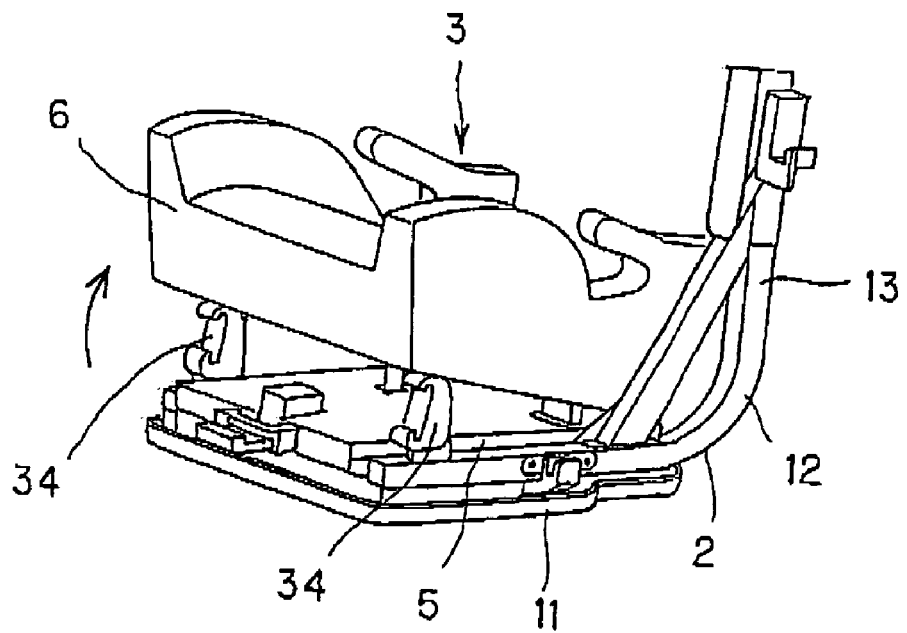
FIG. 10 is a view showing a state where the seat cushion is lifted up in the state shown in FIG. 9.

Moreover, a cushion rotary shaft 57 is disposed at the rear end of the seat cushion portion 6. The cushion rotary shaft 57 extends in the lateral direction of the seat 100, and thus, is rotatably supported on the axis by the bearing portion 42 shown in FIG. 5. Therefore, as shown in FIG. 10, the belt guides 34 can be exposed by lifting up the seat cushion portion 6 around the cushion rotary shaft 57. Here, in order to freely detach the seat cushion portion 6 from the slider 5, the cushion rotary shaft 57 can be detached from the bearing portion 42. The details of the connecting portion will be described below.

Figure 12:
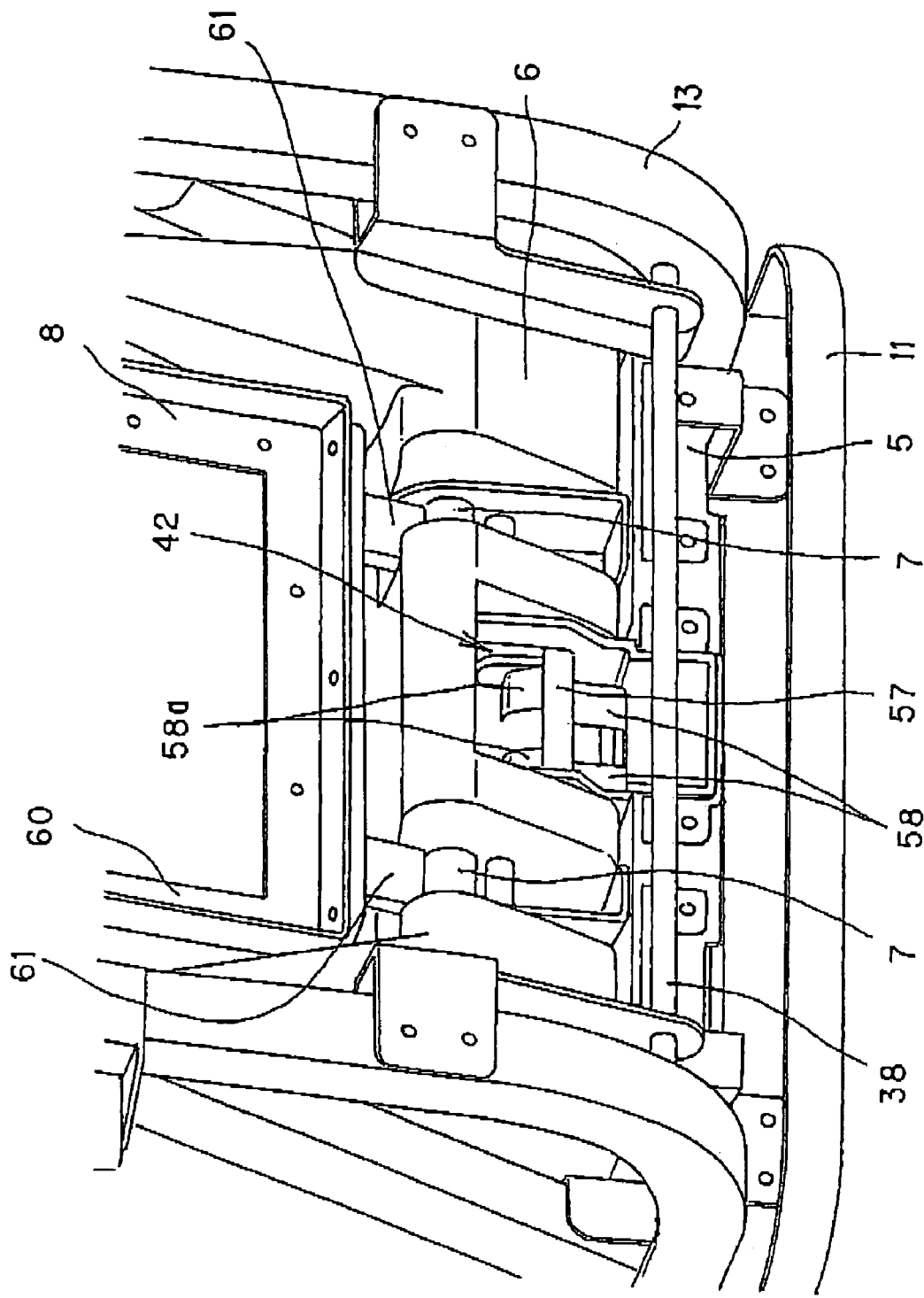
FIG. 12 is a view showing a portion at which the seat cushion and the seat back are connected to each other, as viewed from the back.

FIG. 12 shows the connecting portion between the seat cushion portion 6 and the seat back portion 8 in enlargement. As is obvious from FIG. 12, a pair of holding pawls 58 projecting upward of the slider 5 are disposed at the bearing portion 42 at the rear end of the slider 5. Hooks 58*a* formed at the upper ends of the holding pawls 58 engage with the cushion rotary shaft 57 by fitting the cushion rotary shaft 57 to the holding pawls 58 from the back surface of the base unit 2, thereby inhibiting any of forward and upward movements of the cushion rotary shaft 57. As a result, the seat cushion portion 6 is connected to the slider 5 in a state liftable around the cushion rotary shaft 57. When the seat cushion portion 6 is pushed rearward in the state where the fixing portions 31 and 33 (see FIG. 5) disengage from the seat cushion portion 6 with the seat cushion portion 6 lifted up, the cushion rotary shaft 57 is released from the bearing portion 42, so that the seat cushion portion 6 can be detached from the slider 5.

Figure 13:
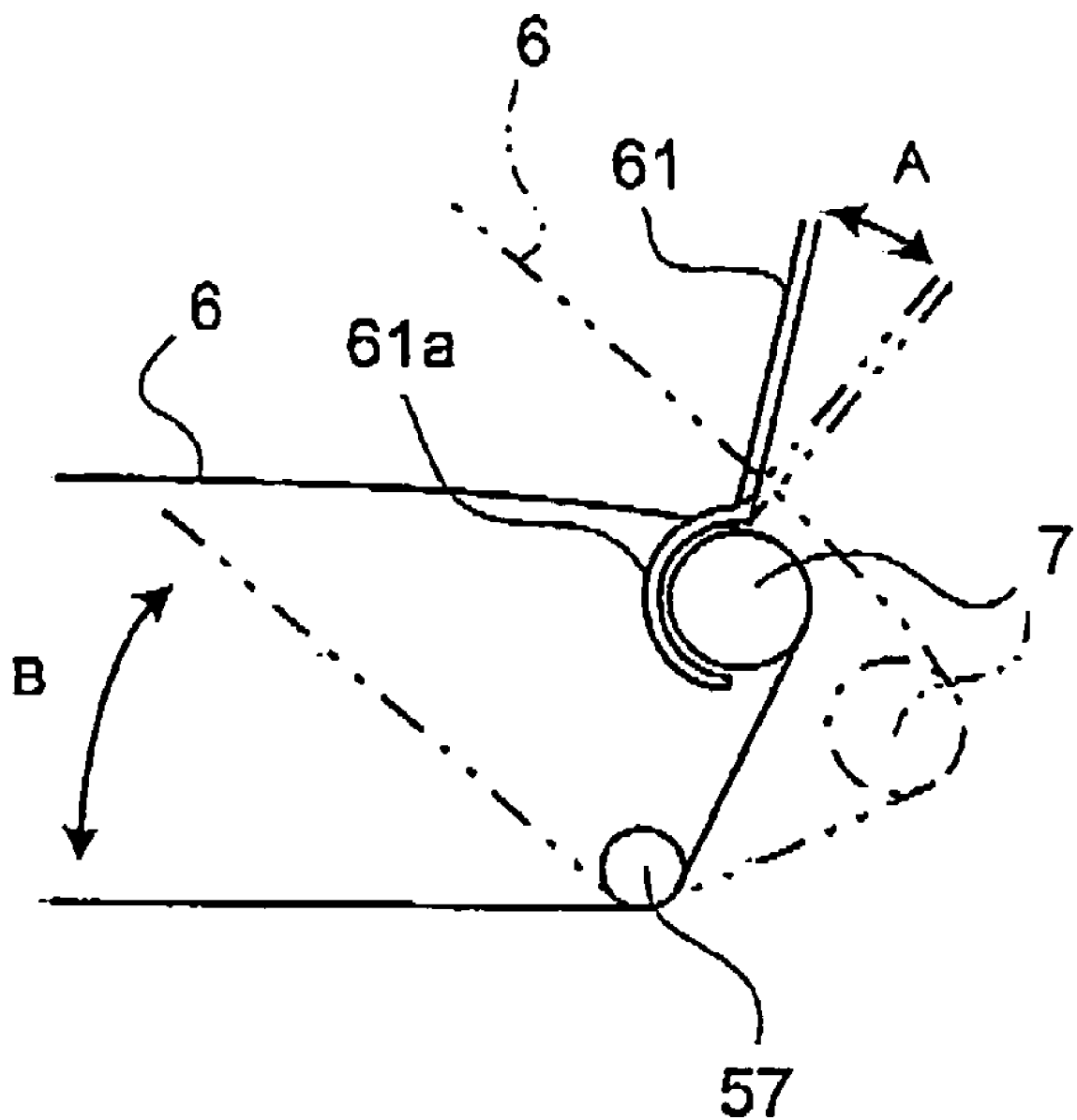
FIG. 13 is a view showing the relationship between operation for lifting up the seat cushion and operation for reclining the seat back with respect to the seat cushion.

Further, as shown in FIG. 12, the pair of struts 7 are disposed coaxially with each other at the rear end of the seat cushion portion 6. A frame 60 for securing the rigidity of the seat back portion 8 is disposed at the back surface of the seat back portion 8, and further, a pair of arms 61 engageable with the struts 7 are disposed at the lower end of the frame 60. As shown in FIG. 13, the arm 61 is provided with a semi-circular portion 61*a* fitted around substantially the fore half circumference of the strut 7. Consequently, the arm 61 is inserted forward of the strut 7, and thus, the semi-circular portion 61*a* engages with the strut 7, so that the seat back portion 8 can be rotatably connected on the strut 7 with respect to the seat cushion portion 6. As indicated by an arrow A in FIG. 13, the arm 61 is rotated on the strut 7, thereby changing the reclining angle of the seat back portion 8. Incidentally, as indicated by an arrow B in FIG. 13, when the seat cushion portion 6 is lifted up on the cushion rotary shaft 57, the strut 7 is away from the arm 61, and therefore, the strut 7 cannot interfere with the lifting-up operation of the seat cushion portion 6.

FIG. 14 shows the details of the connection portion 14 disposed on the back frame 12 in order to connect the seat back portion 8 to the base unit 2. The connection portion 14 includes a pair of cross bars 65 stretched between the main frames 13, a guide rod 66 extending vertically across the cross bars 65, and a vertically movable slider 67 under the guidance of the guide rod 66 and the main frames 13. At the center of the upper portion of the slider 67 is disposed a center supporter 68 projecting forward. On both sides of the center supporter 68 are formed pin inserting holes 68a (only either one of which is shown in FIG. 14). Auxiliary supporters 69 are formed besides the center supporter 68. A receiving groove 69a is formed at each of the auxiliary supporters 69. In addition, a guide pin 70 projecting outward in the lateral direction is formed at the upper portion of each of the auxiliary supporters 69.

In the meantime, slide guides 71 sliding along the main frames 13 are disposed at the lower portion of the slider 67. Moreover, the above-described belt guides 35 (see FIGS. 5 and 8) are disposed inward of the slide guides 71. In this way, the belt guides 35 are vertically moved integrally with the supporters 68 and 69. Consequently, it is possible to position all the time the belt guides 35 in a clearance formed between the side supports 50 and 51 in the seat back portion 8 connected to the slider 67, so as to prevent any change of the drawing position of the shoulder belts 30 with respect to the seat unit 3. Further, each slide guide 71 is selectively fitted into any one of the plurality of pin inserting holes 13a formed at the main frame 13. In this manner, the slider 67 can be selectively positioned at any one of a plurality of positions in the vertical direction.

Figure 15:
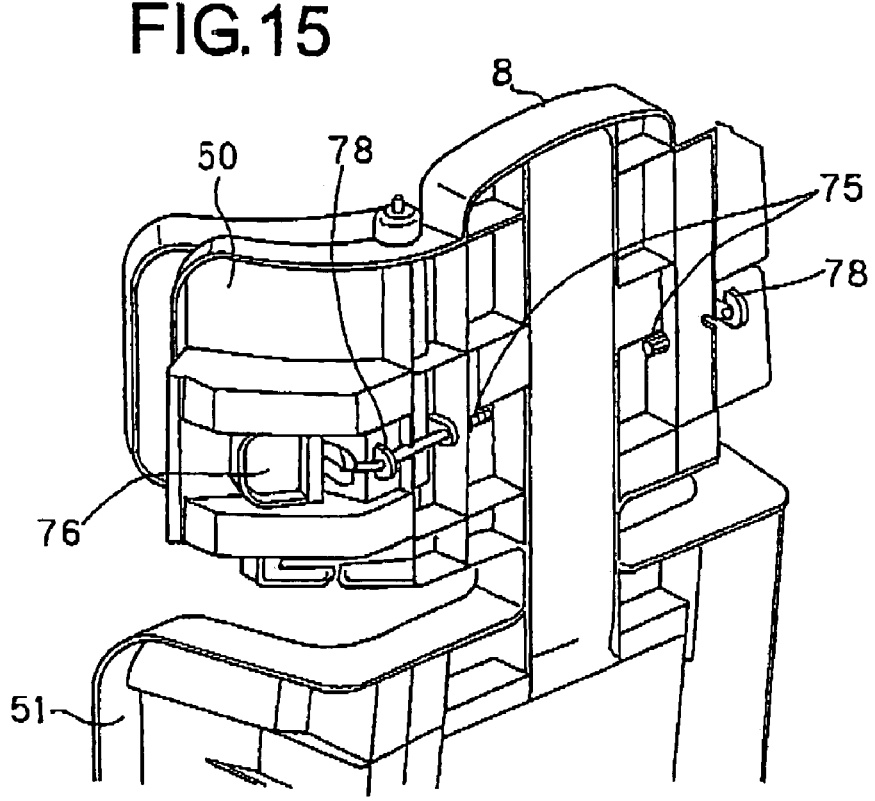
FIG. 15 is a view showing a tension spring for urging a connecting pin against the inside of the seat back.

In the meantime, as shown in FIG. 15, on the back side of each of the side supports 50 in the seat back portion 8, connecting pins 75 to be fitted into the pin inserting holes 68a formed on the slider 67 are secured so as to be slidable in the lateral direction. The seat back portion 8 is connected to the back frame 12 via the slider 67 so as to be rotatable about connecting pins 75 by inserting the connecting pins 75 into the pin inserting holes 68a (see FIG. 14) formed on the sliders 67 of the connecting portion 14.

Figure 16:
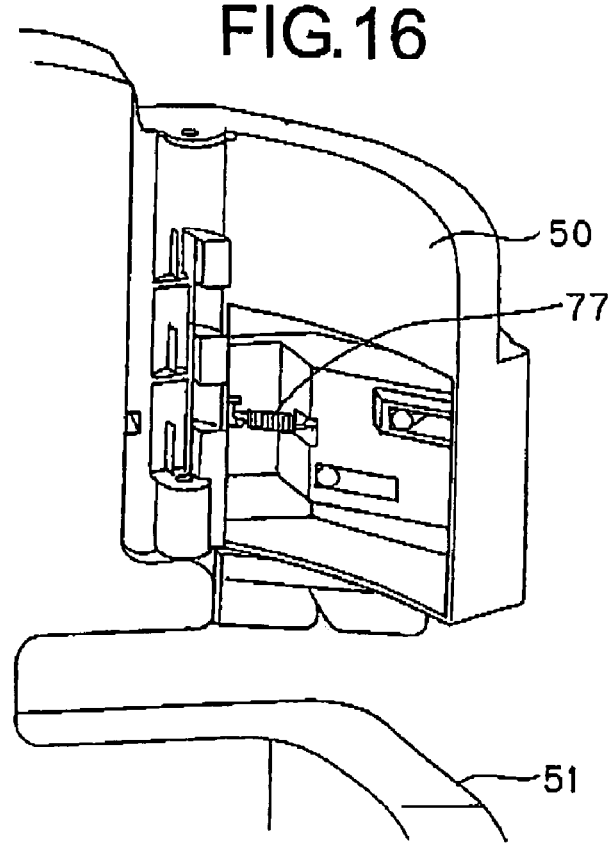
FIG. 16 is a view showing a spring for urging an operating lever at a standby position.

The ends of the connecting pins 75 are connected to operating levers 76, respectively. In FIG. 15, only either one of the operating levers 76 is shown. The operating lever 76 is attached to the side support 50 in a manner slidable in the lateral direction. Furthermore, as shown in FIG. 16, the operating lever 76 is pulled inward of the side support 50 by a tension coil spring 77 serving as an urging device incorporated in the side support 50. When the operating lever 76 is pulled outward against the tensile force of the tension coil spring 77, the connecting pin 75 moves outward, and when the operating lever 76 is released, the connecting pin 75 is returned inward by the tensile force of the tension coil spring 77. With these operations, the connecting pin 75 can be fitted into or drawn from the pin inserting hole 68a formed at the slider 67. Incidentally, as shown in FIG. 15, the connecting pin 75 is inserted into a pin guide 78 whose periphery is rounded into an arcuate shape.

Figure 17:
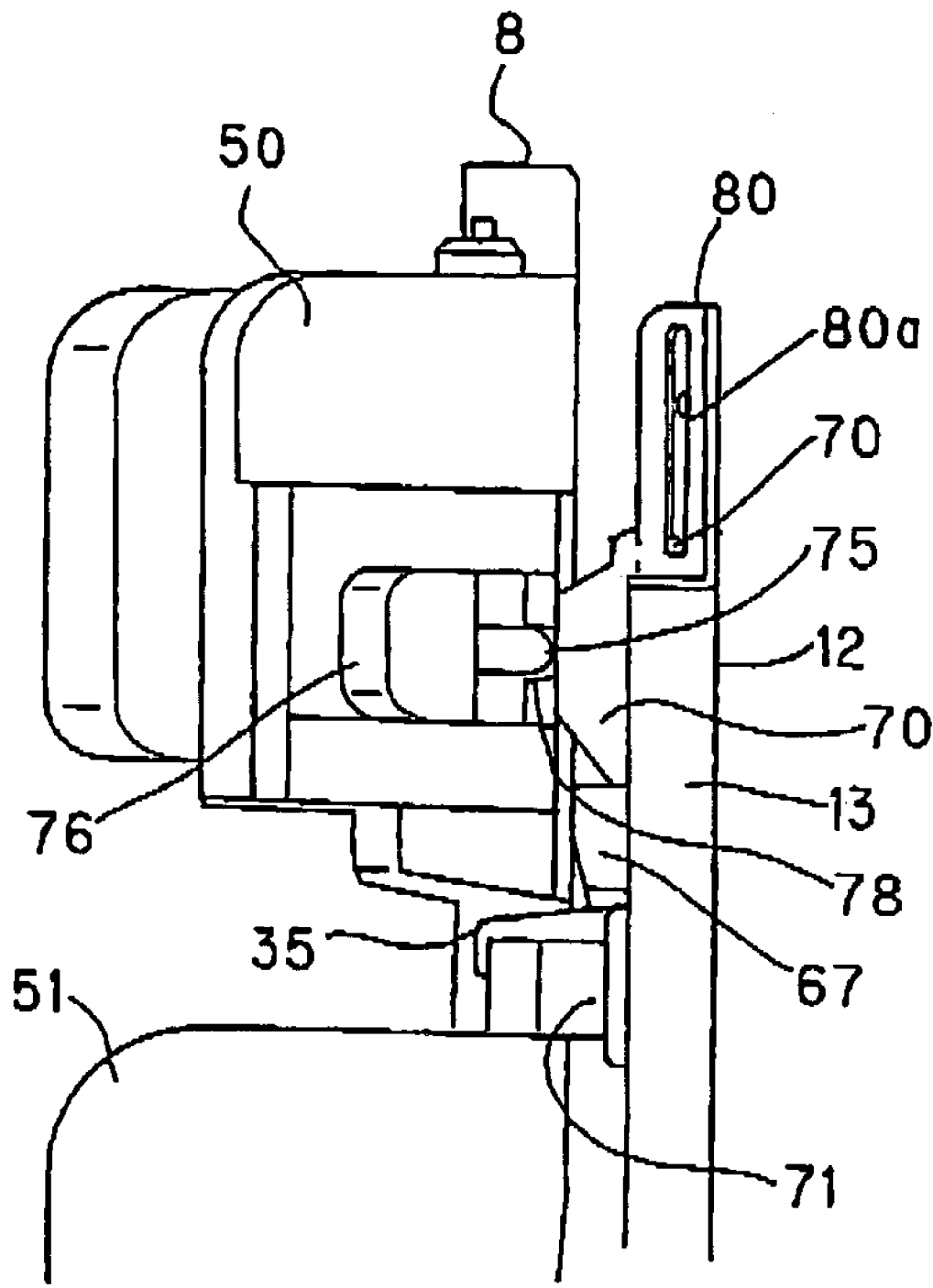
FIG. 17 is a view showing a state where the seat back is connected to a back frame via a connecting portion.

FIG. 17 shows a state where the seat back portion 8 is connected to the back frame 12 via the connecting portion 14. The pin guide 78 with respect to the connecting pin 75 is fitted into the receiving groove 69a (see FIG. 14) of the auxiliary supporter 69 disposed in the slider 67. Consequently, a rearward load to be exerted on the seat back portion 8 can be supported by the supporters 68 and 69.

Moreover, a guide 80 is disposed at the upper end of the main frame 13, and further, a slot 80a extending in parallel in the lengthwise direction of the main frame 13 is formed at the guide 80. The movement direction of the slider 67 is restricted to the lengthwise direction of the main frame 13 by inserting the guide pin 70 of the slider 67 into the slot 80a.

According to the above-described configuration, the seat unit 3 can be attached to the base unit 2 by putting the seat cushion portion 6 onto the slider 5, engaging the cushion rotary shaft 57 with the bearing portion 42, engaging the arm 61 of the seat back portion 8 with the strut 7, and inserting the connecting pin 75 of the seat back portion 8 into the pin inserting hole 68a provided on the slider 67 on the back frame 12. In this state, the child is restrained in the seat unit 3 by using the restraining belt device 4, thereby achieving the child seat of the G1 class.

Additionally, in this usage mode, the inclination of the seat back portion 8 is varied by adjusting the position of the slider 5 in the longitudinal direction by the operation of the position adjusting lever 21, thereby achieving a desired reclining attitude. Incidentally, an expansion/contraction mechanism is incorporated in the seat back portion 8, the change can be absorbed by the expansion/contraction mechanism incorporated in the seat back portion 8 even if the distance between the strut 7 and the connecting pin 75 is changed by the lengthwise movement of the slider 5. Therefore, it is unnecessary to adjust the position of the slider 67 in the vertical direction. In contrast, the height of the headrest 49 can be adjusted according to the build of the child by vertically moving the slider 67.

Further, the seat unit 3 can be detached from the base unit 2 by lifting up the seat cushion portion 6, detaching the cushion rotary shaft 57 from the bearing portion 42, and drawing the connecting pin 75 in the seat back portion 8 from the pin inserting hole 68a, thereby achieving the child seats of the G2 and G3 classes for restraining the child by using only the seat unit 3 or the seat cushion portion 6 and the seat belt of the vehicle.

The present invention is not limited to the above-described embodiment, and therefore, it may be carried out in various modes. For example, the number of belt guides 34 on the base is not limited to two, but it may be appropriately varied if it is necessary to hold the waist belt portion 105. The belt guide 34 may be continuously disposed over the entire width of the slider 5. The present invention is applicable irrespective of the existence of the reclining mechanism by using the slider 5. Moreover, the seat cushion portion and the seat back portion may be molded integrally with each other in the configuration of the seat unit.

In the above-described embodiment, the seat cushion portion 6 and the seat back portion 8 in the seat unit 3 can be detached from each other, thereby coping with the child seat of the G3 class, in which only the seat cushion portion 6 is used. However, the child seat according to the present invention need not always cope with the plurality of classes. The present invention is applicable to a child seat which copes with only a single class as long as a child seat including a base unit and a seat unit is of a type in which the base unit is restrained to a seat by a waist belt portion of a seat belt.

In the child seat according to the present invention, it is not always necessary to fix the seat unit so as to press the seat unit against both of the seat cushion 101 and the seat back 102 on the seat, but the base unit may be configured such that the seat unit is fixed only onto the seat cushion 101. In such a case, the seat back in the seat unit may be supported by the lower portion of the seat back, and at the same time, the upper end of the seat back may be supported by the seat back of the seat. Here, in order to stably support the upper end of the seat back, it is desirable that the base unit should be configured so as to include a portion to be placed on the seat cushion 101 and a portion to be pressed against the seat back 102.

As described above, according to the present invention, since the waist belt guide in the base unit is disposed nearer the fore end, the waist belt portion extending toward the waist belt guide from the buckle of the seat belt or the belt fixing position on a floor in the vehicle is reduced in inclination angle with respect to the horizontal direction in comparison with the case where the waist belt portion is hooked at the rear end of the base unit. Consequently, it is possible to more securely inhibit the movement of the base unit forward of the seat by more firmly restraining the base unit in the longitudinal direction by the waist belt portion. Furthermore, the waist belt is concealed by inserting the waist belt portion between the seat cushion portion and the base unit, thereby producing an advantage of prevention of the movement of the waist belt portion by an external factor.

What is claimed is:

1. A child seat comprising:
   a base unit fixed onto a seat of a vehicle by using a seat belt of the vehicle; and
   a seat unit including a seat cushion portion and a seat back portion and fixable onto the base unit in a forward attitude with respect to the seat of the vehicle, the forward attitude being defined as a manner that the seat cushion portion is located in front of the seat back portion, wherein
   a waist belt portion of the seat belt can be inserted in a lateral direction of the seat of the vehicle between the base unit and the seat cushion portion placed on the base unit, and a waist belt guide for inhibiting the movement of the base unit forward of the seat of the vehicle by hooking the waist belt portion inserted between the base unit and the seat cushion portion is provided in the base unit so as to hold the waist belt portion at a position nearer a fore end than the center in a longitudinal direction of the base unit, and
   the base unit is provided with a base body fixed to the seat of the vehicle and a slider disposed in a positionally adjustable manner in the longitudinal direction with respect to the base body, the seat cushion portion is fixed to the slider and the waist belt guide is fixed to the base body.

2. The child seat according to claim 1, wherein the waist belt guide is provided such that the waist belt portion is hooked in a state oriented substantially vertically in a width direction.

3. The child seat according to claim 1, wherein the base unit is provided with a restraining belt device which comprises a pair of shoulder belts for restraining a child sitting on the seat cushion portion and a crotch belt connected to the shoulder belts, one end of each of the shoulder belts and the crotch belt is fixed to a belt fixing portion of the slider, and the waist belt guide is provided such that the waist belt portion passes between the seat cushion portion and the base unit forward of a position of the belt fixing portion with respect to the crotch belt when the slider is positioned at a fore end within a movable range of the slider.

4. The child seat according to claim 1, wherein a recess, through which the waist belt portion passes, is formed on the lower side of the seat cushion portion so as to prevent any interference of the seat cushion portion with the waist belt portion over the entire region within the movable range of the slider.

5. The child seat according to claim 1, wherein the seat cushion portion is movably disposed with respect to the base unit so as to allow the waist belt guide to be exposed.

6. The child seat according to claim 5, wherein the waist belt guide is exposed by lifting up the seat cushion portion around a cushion rotary shaft extending in the lateral direction of the seat of the vehicle disposed at an end in the longitudinal direction of the seat cushion portion.

7. The child seat according to claim 1, wherein a back supporter abutting against a seat back of the seat of the vehicle so as to support the seat back portion from a back side thereof is disposed in the base unit, and the back supporter is provided with a lock-off device for restraining a shoulder belt portion of the seat belt of the vehicle.

* * * * *